Sept. 19, 1967 R. F. SHANNON 3,342,665
REINFORCED STRUCTURAL PANELS
Filed Feb. 19, 1962

INVENTOR.
RICHARD F. SHANNON
BY
ATTORNEYS

United States Patent Office 3,342,665
Patented Sept. 19, 1967

3,342,665
REINFORCED STRUCTURAL PANELS
Richard F. Shannon, Lancaster, Ohio, assignor to Owens-Corning Fiberglas Corporation, a corporation of Delaware
Filed Feb. 19, 1962, Ser. No. 174,064
3 Claims. (Cl. 161—36)

The present invention relates to improved structural panels for a slab type roof deck or the like, and more particularly to lightweight insulating panels using glass fiber boards bonded together with organic resins or inorganic cements.

This type of panel has been produced by slicing preformed glass fiber boards into strips and individually coating the surfaces of the strips with inorganic cements. After coating, each of the strips was turned 90 degrees to place the fibers on end, and then the rotated strips were bonded together to form a slab.

The number of steps involved in this process was excessive, and the panels were heavy because of the relatively thick layers of non-reinforced cements between the strips. Also, many times the panels were not sufficiently strong to span required distances.

The structural problems of the previously discussed panels have been solved by the present invention which contemplates filling slots or folds in fibrous glass cores with a cement that is capable of penetrating the glass fiber pack and hardening the cement to form areas of reinforcement within the core.

Therefore an object of the invention is to provide a strong structural panel which is produced at a low cost.

A further object of the invention is to provide an improved structural panel having a high strength region of combined cement and glass fiber core material adjacent each surface and giving a maximum strength with a minimum of cement.

A still further object of the invention is to provide an improved method for producing structural panels which involve the handling of only large core sections.

Further objects and advantages of the invention will be apparent from the following specification and drawings in which like numbers are used throughout to identify like parts.

Figure 1:
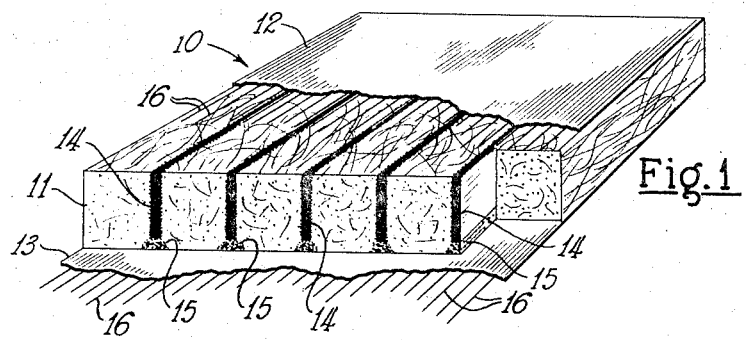
FIG. 1 is a perspective view, partially broken away, showing one form of a structural panel made in accordance with the invention, which form hereinafter will be referred to as a routed I-beam construction.

Referring now to FIG. 1, there is shown a structural panel 10 of the type that is customarily called a routed I-beam construction. The panel 10 comprises a fibrous glass wool core 11 that is capped by a top supporting skin 12 and a bottom supporting skin 13 that are parallel to one another. The core 11 may vary in thickness from ¾ inch to 2 inches and have a density which is preferably between 6½ and 11 pounds per cubic foot.

In order to strengthen the panel 10, a plurality of reinforcing beams 14 of a hardened cementing material are located within the wool core 11. The beams 14 are not only parallel to each other but are perpendicular to the skins 12 and 13.

The beams 14 are produced by first making a plurality of parallel cuts in the core 11 with a suitable tool such as a router. All of the cuts extend from the same side of the panel 10 toward the opposite surface but do not extend completely through the core 11. Preferably the bottom of each cut is within 1/16 inch of the opposite surface.

The cuts are then filled with an uncured bonding material which, upon hardening, forms the I-beams. For best results a cement slurry that is capable of penetrating the core 11 is placed in each of the cuts, and this bonding material will flow from the bottom of each cut to the opposite face of the core 11 in the areas indicated at 15 in FIG. 1. Inorganic cements such as magnesium oxysulfate, oxyphosphate, or oxychloride cements not only penetrate downwardly into the core 11 but also produce strong beams 14 by lateral penetration therein to form regions of combined cement and reinforcing fibers.

After the I-beams 14 are formed by hardening the cement in the cuts the core 11 is capped by applying the skins 12 and 13. The same cement that is used in making the I-beams 14 is also used for making these skins, and while the skins 12 and 13 may be composed entirely of cement, a plurality of parallel strands 16 of 20-end roving are preferably added for strength. This reinforcement may also be in the form of chopped fibers or mat, and five basic types of glass reinforcing media have been used with satisfactory results. These are: 10 mil bonded mat, one ply of base mat, one ply of ½ ounce mechanical mat, two inch length of 150s cut strands, and 20-end parallel roving. The glass content of the skins 12 and 13 may vary between 3 to 19 grams per square foot of surface area.

A neutral, e.g. pH 6 to 8, high strength calcium sulfate hemihydrate is preferred to make the I-beam 14. The hemihydrate can be an alpha gypsum of the Hydrocal class which has a neutral pH and high strength, "Industrial White Hydrocal," a product of the U.S. Gypsum Company, having a normal consistency of 38 to 42, being suitable. Plaster of Paris and Keene's cement are also examples of neutral, high strength hemihydrates that are satisfactory. Keene's cement is made by soaking plaster of Paris in a solution of alum or borax and cream of tartar. "Industrial White Hydrocal" is a neutral gypsum which sets to a high strength dihydrate. The neutral, high strength calcium sulfate hemihydrate used for the beams 14 should have a compressive strength of 3500 p.s.i., a hardness of 80–85, and a maximum setting expansion of .003 inch per inch of product.

Two samples using "Industrial White Hydrocal" for the cement in both the I-beams 14 and the skins 12 and 13 were prepared by routing a preformed wool board on 1¼ inch centers. The various structural features of these samples are listed below in Table No. I.

TABLE I

|  | Sample Number | |
|---|---|---|
|  | 1 | 2 |
| Core Board Thickness (inches) | 2 | 1½ |
| Core Board Density (p.c.f.) | 8 | 6.6 |
| Weight of roving in skins (g.s.f.) | 15.6 | 14.6 |
| Finished panel density | 17.1 | 13.2 |
| Finished panel composition: |  |  |
| Cement (percent) | 55.6 | 50.0 |
| Glass (percent) | 44.4 | 50.0 |

This gypsum cement gives stationary results where the panel is not required to have extremely high strength characteristics because the gypsum particles themselves are irregular in shape and have sharp corners. These particles tend to snag on the glass fibers and prevent the cement slurry from penetrating very deeply within the core material. A high strength magnesium oxysulphate, oxychloride or oxyphosphate type of cement wherein magnesium oxide particles have rounded edges is preferred where high strength is of major importance. This cement has excellent fiber penetrating ability, and it is this characteristic of the magnesium oxysulphate that enables the structures shown in FIGS. 2, 3 and 4 to be produced. The particles of magnesium oxide can be generally spherical, "egg-shaped" or the like, but must have rounded edges.

Figure 2:
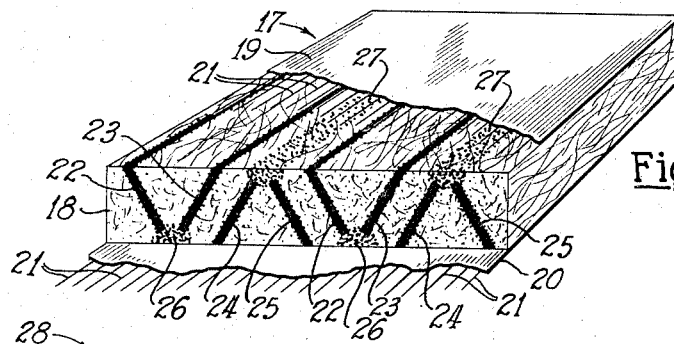
FIG. 2 is a perspective view, partially broken away, showing another form of a structural panel made in accordance with the invention.

Referring now to FIG. 2, there is shown a structural panel 17 which comprises a glass wool core 18 interposed between a top supporting skin 19 and a bottom supporting skin 20. The material of the core 18 is identical with that of the core 11 shown in FIG. 1. Likewise, the skins 19 and 20 are reinforced with strands 21 of roving, and these skins are the same as the skins 12 and 13.

The panel 17 is strengthened by a plurality of angularly disposed beams in the wool core 18. As shown in FIG. 2 a plurality of spaced parallel I-beams 22 extend diagonally from the top supporting skin 19 toward the bottom supporting skin 20. A second series of hardened reinforcing beams 23 likewise extends diagonally from the top supporting skin 19 toward the bottom supporting skin 20, but terminate short of the latter skin. The I-beams 22 and 23, if extended, would intersect in an imaginary line that is in the bottom supporting skin 20. The panel 17 is further reinforced by spaced parallel I-beams 24 which extend diagonally from the bottom supporting skin 20 toward the top supporting skin 19 while a plurality of similar I-beams 25 extend diagonally from the bottom supporting skin 20 at an angle to the beams 24. The beams 23 and 23 terminate short of the skin 19, but, if extended, would intersect in an imaginary line that is in the top supporting skin 19. The beams 25 are preferably parallel to the beams 22 while the beams 24 are preferably parallel to the beams 23 as shown in FIG. 2.

The I-beams 22 and 25 are formed by first cutting slots in the core 18 in the manner shown in FIG. 2 and then filling these slots with a hardenable cementing material as previously described. Upon hardening, this material forms the reinforcing beams in the core 18 of the panel 17 for added strength. Inasmuch as the cuts do not extend completely through the core 18, a cement of the type previously described having good penetrating characteristics is preferably used, and this cement flows from the termination of the beams 22 and 23 to the bottom skin 20 in the area indicated at 26 in FIG. 2. Likewise the uncured slurry in the slots for the beams 24 and 25 penetrates the core 18 in the area indicated at 27 adjacent the top skin 19. Lateral penetration also forms the high strength regions of cement reinforced with fibers of the core material.

Figure 3:
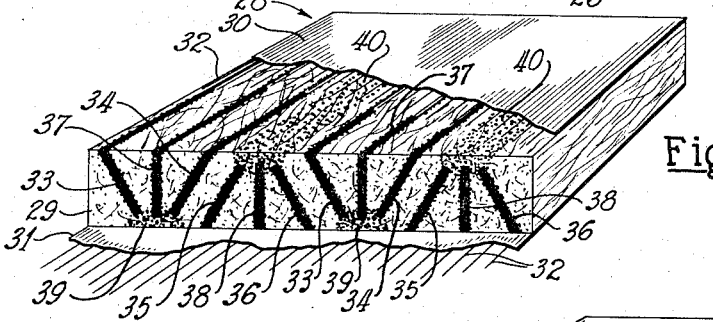
FIG. 3 is an enlarged perspective view, partially broken away, showing still another embodiment of the structural panel made in accordance with the invention.

Still another embodiment of the invention is illustrated by a panel 28 shown in FIG. 3. The panel 28 includes a core 29 of the material used in the cores 11 and 18 as previously described, and the core 29 is interposed between a top supporting skin 30 and a bottom supporting skin 31, both of which are reinforced with strands 32 in the manner previously described in connection with the skins 12, 13, 19 and 20.

The panel 28 incorporates the structural features of the panel 10, as well as those of the panel 17. More particularly, a plurality of diagonal I-beams 33 to 36 extend into the core 29, and these I-beams correspond to the I-beams 22 to 25 in the panel 17. The panel 28 further utilizes a plurality of vertical I-beams 37 and 38 which correspond to the I-beams 14 of the panel 10. The I-beams 37 extend downwardly from the top skin 30 between the diagonal I-beams 33 and 34 while the vertical I-beams 38 extend upwardly from the bottom skin 31 between the diagonal I-beams 35 and 36. As in the case of the previously described panels 10 and 17, a cement slurry is utilized which exhibits excellent core penetrating characteristics and forms penetrated areas of reinforcement indicated at 39 between the bottoms of the I-beams 33, 34, 37 and the bottom skin 31. Likewise a similar penetrated area of reinforcement 40 is formed between the I-beams 35, 36, 38 and the top skin 30. Lateral penetration is also important, as described above.

Figure 4:
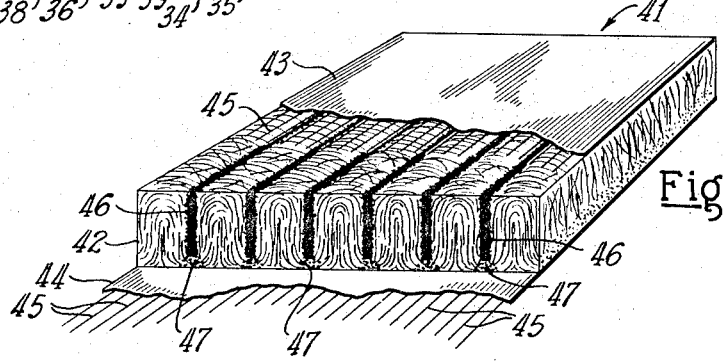
FIG. 4 is a perspective view, partially broken away, showing still another embodiment of a structural panel made in accordance with the invention.

Still another embodiment of the invention is shown in FIG. 4 wherein a panel 41 comprising a core 42 interposed between a top skin 43 and a bottom skin 44, both of which are strengthened by strands 45 of roving, is reinforced by a plurality of parallel I-beams 46. A hardenable cementing material is used to form the I-beams 46 which are quite similar to the I-beams 14 of FIG. 1 in that they extend from the top skin 43 toward the bottom skin 44 of the panel 41 but do not extend completely through the core 42.

The I-beams 46 are formed by first folding or pleating the glass wool material of the core 42 and then filling the folds with a cement slurry of the type previously described. This slurry preferably has good penetrating characteristics and penetrates the core material laterally and downwardly, forming penetrated reinforcing areas 47 between the bottoms of the folds and the bottom skin 44. Similar additional I-beams can be provided in the upwardly extending folds of the core 42.

While the preferred embodiments of the invention have been shown and described, it will be apparent that various modifications can be made to the panels without departing from the spirit of the invention or the scope of the subjoined claims.

I claim:
1. A lightweight structural panel comprising a core of intermeshed glass fibers, a plurality of spaced masses of hardened inorganic cementing material having good core penetrating characteristics extending into said core from one surface thereof and terminating a distance from the opposite surface, and a penetrated area of hardened cementing material extending from the innermost end of each of said masses to the opposite surface of said core.

2. A lightweight structural panel comprising a core of intermeshed glass fibers, a plurality of spaced masses of hardened cementing material selected from the group consisting of a high strength magnesium oxysulphate, magnesium oxychloride, and magnesium oxyphosphate cement extending into said core from one surface thereof and terminating a distance from the opposite surface, and a penetrated area of said cementing material extending from the innermost end of each of said masses to the opposite surface of said core.

3. A lightweight structural panel comprising a core of intermeshed glass fibers, a plurality of spaced masses of a hardened inorganic cementing material extending into said core from one surface thereof and terminating a distance from the opposite surface, penetrated reinforcing areas of hardened cementing material adjacent each opposed face of said masses of hardened cementing material and extending from the innermost end of each of said masses to the opposite surface of said core, and supporting skins on said surfaces comprising layers of hardened inorganic cementing material containing glass fibrous reinforcing material.

References Cited
UNITED STATES PATENTS

| | | | |
|---|---|---|---|
| 217,209 | 1/1883 | Bartlett. | |
| 616,479 | 12/1898 | Martin | 161—132 |
| 1,172,543 | 2/1916 | Mastin | 161—69 |
| 1,301,686 | 4/1919 | Grosjean | 161—69 |

(Other references on following page)

UNITED STATES PATENTS

| | | | |
|---|---|---|---|
| 1,417,553 | 5/1922 | Muench | 405—410 |
| 2,007,148 | 7/1935 | White et al. | 600—601 |
| 2,159,300 | 5/1939 | Tashjean | 161—53 |
| 2,500,690 | 3/1950 | Lannan | 156—204 |
| 2,546,230 | 3/1951 | Modigeiani | 156—264 |
| 2,703,762 | 3/1955 | Slayter | 106—105 |
| 2,782,465 | 2/1957 | Palmer | 154—44.15 |
| 3,000,144 | 9/1961 | Kitson | 50—268 |

OTHER REFERENCES

Lea et al.: "The Chemistry of Cement and Concrete," 1956, pp. 19 and 20 cited.

ALEXANDER WYMAN, *Primary Examiner.*

EARL M. BERGERT, ALEXANDER WYMAN,
*Examiners.*

R. J. ROCHE, *Assistant Examiner.*